March 12, 1957　　J. F. CHAMBERLIN ET AL　　2,784,979
LUGGAGE CART
Filed April 18, 1955　　2 Sheets-Sheet 1
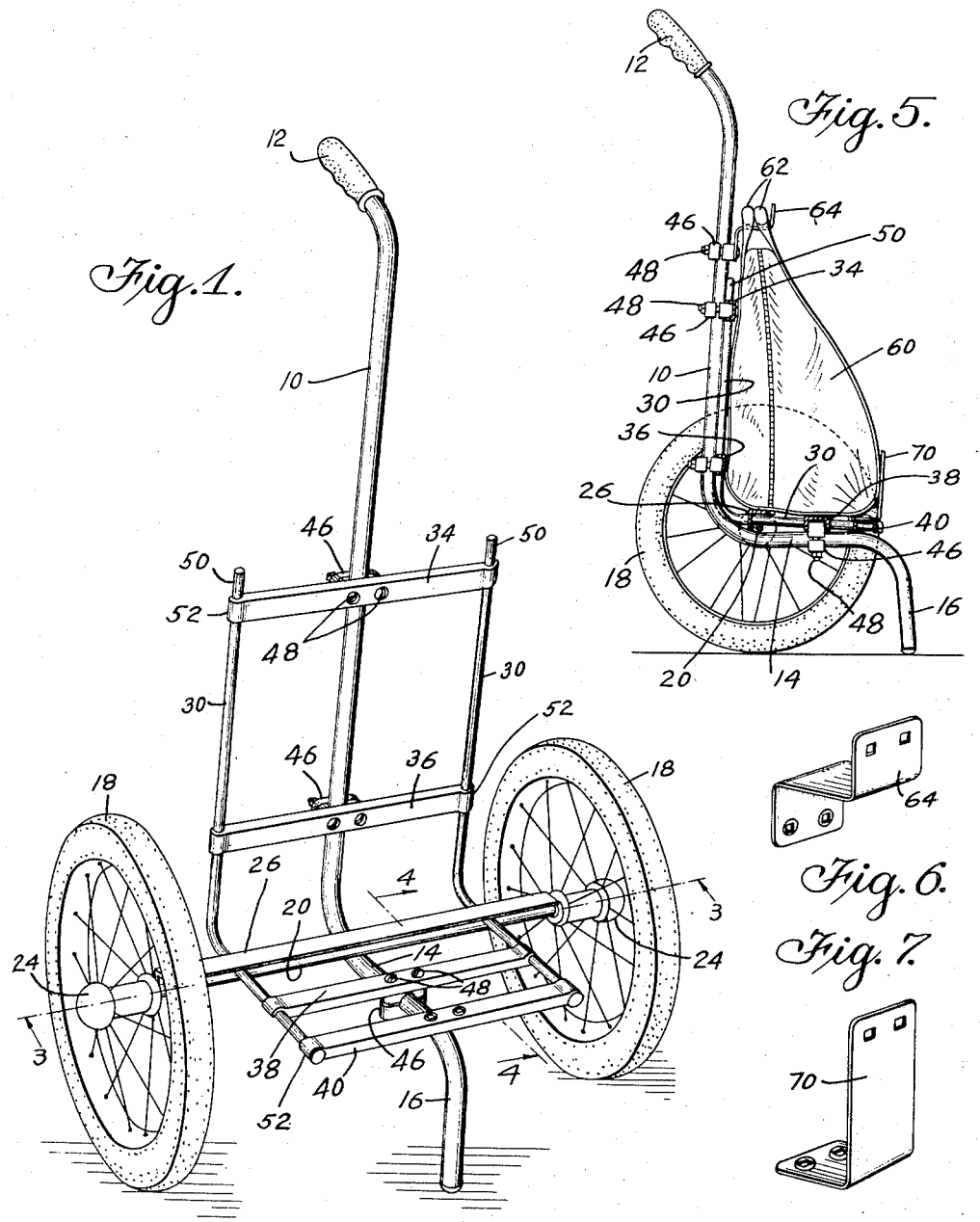
INVENTORS
JOSEPH F. CHAMBERLIN
BY ROBERT A. WESTPHAL
ATTORNEY March 12, 1957     J. F. CHAMBERLIN ET AL     2,784,979
LUGGAGE CART
Filed April 18, 1955                                    2 Sheets-Sheet 2
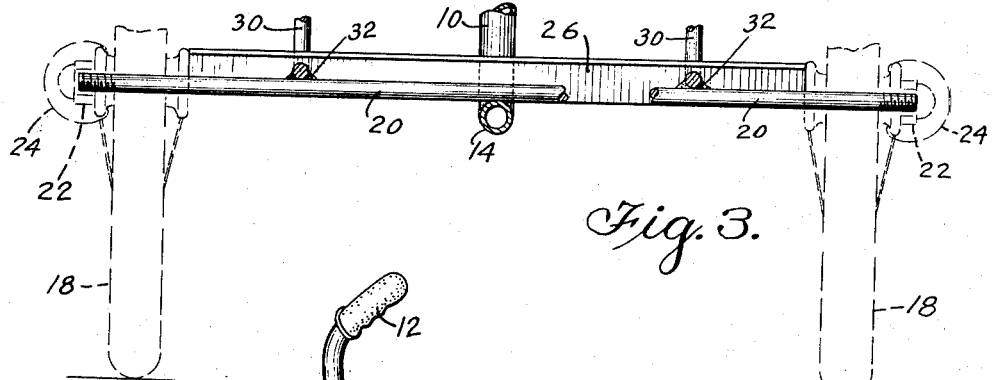
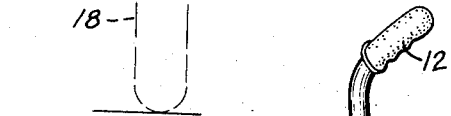
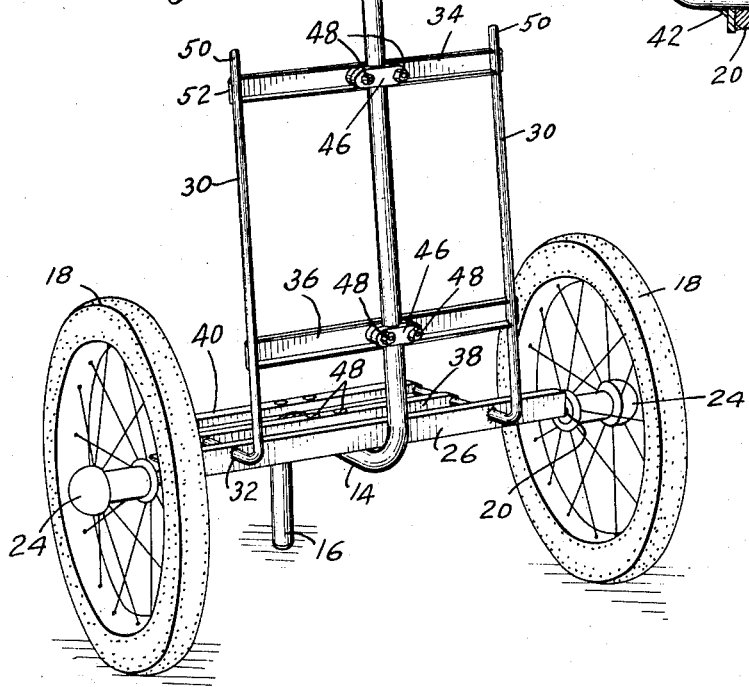
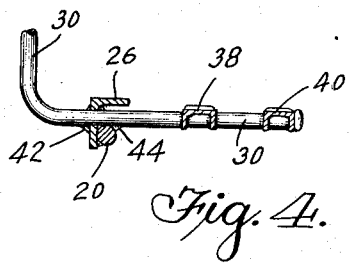
INVENTORS
JOSEPH F. CHAMBERLIN
BY ROBERT A. WESTPHAL
ATTORNEY United States Patent Office 2,784,979
Patented Mar. 12, 1957

2,784,979

LUGGAGE CART

Joseph F. Chamberlin and Robert A. Westphal, Chicago, Ill.

Application April 18, 1955, Serial No. 502,170

10 Claims. (Cl. 280—47.24)

This invention relates to an improved luggage cart, and the present invention comprises further improvements over our earlier invention entitled "Cart for Golf Bags," application for U. S. Letters Patent on which was filed May 12, 1953, Serial No. 354,488, now Patent No. 2,741,490, dated April 10, 1956. Also our application for patent on "Mail Bag Cart," filed January 24, 1955; Serial No. 483,691.

One of the important objects of this invention is to provide, in a device of the class described, means for readily and easily carrying various types of luggage, salesmen's cases, typewriters and other fairly heavy and sometimes unwieldly objects.

Another important object of the invention is to provide a luggage cart which will be especially reinforced at the points usually carrying the greatest weight and wherein additional appurtenances can be readily applied to the cart for the purpose of facilitating the handling and transportation of irregularly shaped objects which, on account of their contours and weights, would ordinarily present quite a problem in transportations, particularly for relatively short distances.

Yet another object of the invention is to provide, in a luggage cart, a unitary combination of supporting and handling elements so arranged with respect to the supporting wheels that the load carried by the cart is practically always positioned substantially over the axle or on the center of gravity of the device when the same is being moved.

Other and further important objects of the invention will be apparent from the disclosures in the accompanying drawing and following specification.

The invention, in a preferred form, is ilustrated in the drawings and hereinafter more fully described.

In the drawings:

Figure 1 is a front perspective view of the improved luggage cart of this invention, illustrating the basic structure.

Figure 2 is likewise a perspective view, but taken from the rear of the cart.

Figure 3 is an enlarged, transverse section, parts being broken away, taken on the line 3—3 of Figure 1.

Figure 4 is a detailed section on the line 4—4 of Figure 1 looking in the direction indicated by the arrows.

Figure 5 is a side elevation of the device, partly in section and parts being broken away, illustrating a modified form.

Figure 6 is a perspective view of a portion of the apparatus depicted in Figure 5.

Figure 7 is likewise a perspective view of another part of the structure of Figure 5.

As shown in the drawings:

The reference numeral 10 indicates generally the main body portion of the improved luggage cart of this invention, the same comprising essentially a tubular element shaped as best shown in Figures 1 and 2. This is preferably of metal, but may be of other material and obviously other shapes and contours may be employed.

A handle 12 is usually fitted on to the top end of the body 10 for convenient operation.

The lower portion of the body 10 is bent forwardly and thence downwardly as at 14 and 16 respectively, and the portion 16 provides a ground contacting element as shown. This ground contacting element obviously operates as such only when the device is at rest or being loaded.

The cart is equipped with a pair of wheels 18 suitably mounted on an axle 20 and fastening nuts 22, together with escutcheons 24, serve to assist in retaining the wheels in desired position on the axle.

As best shown in Figures 1, 3 and 5, the axle is welded or otherwise suitably affixed to the portion 14 of the body 10 at the middle of the axle. A reinforcing element in the form of an angle-iron or the like 26 is fitted on to the axle as by welding or in some other manner, and extends completely thereacross between the wheels 18. The ends of the angle-iron 26 provide stops against which the inner faces of the wheel hubs react. This also assists in maintaining the wheels in desired position.

A supporting platform is fitted on to the body elements 10—14 and this includes a pair of bars, tubes or the like 30 bent as shown to conform in outline to the corresponding parallel contour of the body element 10—14. These bars are welded or otherwise affixed to the axle 20 at points 32, as best shown in Figure 3, and are above the axle, thereby distinguishing from the attaching relationship of the body element 14, which is below the axle. These bars are spaced a sufficient distance apart in order to provide a suitable support for objects to be carried on the cart between the wheels and it will be noted that the bars 30 extend upwardly to approximately half of the height of the body portion 10.

Cross pieces 34, 36, 38 and 40 connect the side bars 30 to each other and to the body sections 10 and 14. These are spaced as shown, thereby providing a substantial platform for supporting a wide variety of objects on the cart while at the same time the upper two elements 34 and 36 provide a combination back support and also means for retaining various objects on the cart when the handle of the same is tilted rearwardly for operational movement.

The cross supports 34, 36, 38 and 40 are preferably of channel shape as best shown in Figure 4, and it will be noted from this figure, and also from Figure 3, that the side bars 30 pass through suitable openings in the angle element 26 and are usually welded thereto as at 42. Similar welding 44 also connects the side bars 30 to the axle 20.

Clamping elements 46, which include fastening nuts 48, complete the assemblage of the cross bars 34, etc. to the body portions 10 and 14, and the side bars 30 preferably extend slightly beyond and above the upper cross bar 34 as shown at 50, thereby providing additional supporting elements upon which some objects can be carried, as by hooking the same thereon. The connections between the side bars 30 and the cross pieces 34 etc. are preferably made by welding with some preliminary, correspondingly curved shaping of the ends of the cross bars as indicated at 52.

In Figures 5, 6 and 7 a slight adaptation of the invention is illustrated, whereby the same can be employed to conveniently support and transport an object of irregular dimensions and some considerable weight, such being exemplified as the representation of a typewriter or similar object in a flexible carrying case or the like 60, having handles 62.

A hook-like projection 64 (Figure 6) can be mounted in juxtaposed relationship with the clamp 46 by means of the bolts 48 in an obvious manner, and a retaining element 70 (Figure 7) can be fixed on to the bottom cross bar 40 in a similar manner for preventing undesirable movement of the object 60 or like element and to assure of the same being properly retained in desired position on the cart during handling.

It will be evident that herein is provided a luggage cart having a multiplicity of uses, and which, with a few adaptations and simple appurtenances, can be applied to further uses for load carrying purposes. The same is of simple construction, economical of manufacture, yet very sturdy and capable of transporting reasonably heavy loads and rather unwieldy objects with a maximum of ease in operation.

The cart may be used by a salesman for transporting his sample cases. It can be used for a postman, for carrying mail; it can be used by housewives for shopping purposes. With little or no change it can be used to carry golf bags and clubs, which was one of the original objects of carts of this type, designed by the inventors, and the same can be used in factories and warehouses for loads which are not excessive.

We are aware that many changes may be made and numerous details of construction varied throughout a wide range without departing from the principles of this invention, and we therefore do not propose limiting the patent granted hereon otherwise than as necessitated by the prior art.

We claim as our invention:

1. A luggage cart comprising a unitary body portion, including a handle, a relatively horizontal section and a depending vertical ground contacting end portion, a load carrying platform on the horizontal section, an axle transverse of and above the horizontal portion of the body, wheels on the ends of the axle, an angle-iron reinforcement in parallel relationship to the axle, the ends of said angle-iron reinforcement serving as limiting stops for assisting in positioning the wheels, a pair of L-shaped side bars forming part of the load carrying platform, said bars passing through the angle-iron and welded on to the axle above the same, and also extending upwardly in parallel relationship to the main body portion.

2. A device as described in claim 1, wherein a plurality of cross bars connect the side bars.

3. A device as described in claim 2, wherein all of said crossbars are connected to the unitary body portion.

4. A device described in claim 3 wherein clamping means connect the cross bars to the unitary body portion.

5. A device as described in claim 4, wherein the ends of the cross bars are welded to the side bars.

6. A device as described in claim 5, wherein certain of the cross bars connect the side bars to the unitary body portion above the axle and angle-iron and wherein certain other of the cross bars connect the side bars to the horizontal body section beyond the axle and angle-iron to form said load-carrying platform.

7. A device as described in claim 1, wherein a hook element for objects to be supported on the cart are provided at the junction of the uppermost cross bar and the body portion.

8. A device as described in claim 7 wherein a stop and retaining element for an object to be supported on the platform is provided at the junction of the outermost cross bar and the lower horizontal section.

9. A device as described in claim 8, wherein said stop element is removable and wherein clamps, bolts and nuts interconnect the hook element, the cross bar and the body portion.

10. A device as described in claim 7, wherein said hook element is removable and wherein clamps and bolts interconnect the hook element, the cross bar and the body portion.

References Cited in the file of this patent

UNITED STATES PATENTS

| | | |
|---|---|---|
| 1,820,765 | Anderson | Aug. 25, 1931 |
| 2,474,373 | Seiden | June 28, 1949 |
| 2,639,163 | Walker | May 19, 1953 |
| 2,650,786 | Platt | Sept. 1, 1953 |
| 2,704,165 | Hoover | Mar. 15, 1955 |

FOREIGN PATENTS

| | | |
|---|---|---|
| 965,360 | France | Sept. 11, 1950 |